United States Patent
Groenaas et al.

(10) Patent No.: US 9,759,828 B2
(45) Date of Patent: Sep. 12, 2017

(54) DETERMINING A STREAMER POSITION

(75) Inventors: Halvor Sehested Groenaas, Oslo (NO); Svein Arne Frivik, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 1296 days.

(21) Appl. No.: 13/019,606

(22) Filed: Feb. 2, 2011

(65) Prior Publication Data
US 2012/0195163 A1     Aug. 2, 2012

(51) Int. Cl.
G01V 1/38     (2006.01)

(52) U.S. Cl.
CPC .................. *G01V 1/3817* (2013.01)

(58) Field of Classification Search
CPC ............... G01V 1/3817; G01V 1/3835
USPC ........................................... 367/19
See application file for complete search history.

(56) References Cited

U.S. PATENT DOCUMENTS

| | | | |
|---|---|---|---|
| 4,641,287 A * | 2/1987 | Neeley | 367/19 |
| 5,128,904 A * | 7/1992 | Chambers | 367/129 |
| 5,668,775 A * | 9/1997 | Hatteland | 367/19 |
| 6,005,828 A * | 12/1999 | Carroll et al. | 367/19 |
| 2007/0223308 A1* | 9/2007 | Frivik et al. | 367/19 |
| 2008/0270035 A1* | 10/2008 | Ozdemir et al. | 702/17 |
| 2008/0279045 A1* | 11/2008 | Vigen et al. | 367/99 |
| 2009/0245019 A1* | 10/2009 | Falkenberg et al. | 367/17 |
| 2009/0296519 A1* | 12/2009 | Keers et al. | 367/19 |
| 2010/0061187 A1* | 3/2010 | Sodal | 367/131 |
| 2010/0265800 A1* | 10/2010 | Eatwell | 367/127 |
| 2011/0007603 A1 | 1/2011 | Frivik et al. | |
| 2011/0116343 A1 | 5/2011 | Groenaas et al. | |

OTHER PUBLICATIONS

EESA Navipedia, GPS signal plan, http://www.navipedia.net/index.php/GPS_Signal_Plan, 2011, 1-10.*
Wikipedia, GPS signals, http://en.wikipedia.org/wiki/GPS_signals, 2007, pp. 1-6.*
AEWA, Radar frequency bands,http://www.aewa.org/Library/rf_bands.html, 2001, pp. 1.*

* cited by examiner

*Primary Examiner* — Hovhannes Baghdasaryan

(57) ABSTRACT

A technique includes receiving data acquired by a seismic sensor on a spread of at least one streamer. The data are indicative of a seismic source signature that is produced by a source seismic to penetrate into the Earth to acquire geophysical information in connection with a seismic survey. The technique includes processing the data to determine a position on the streamer relative to a reference position not disposed on the streamer.

25 Claims, 6 Drawing Sheets

DETERMINING A STREAMER POSITION

BACKGROUND

The invention generally relates to determining a streamer position.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensor or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving data acquired by a seismic sensor on a spread of at least one streamer. The data are indicative of a seismic source signature that is produced by a source seismic to penetrate into the Earth to acquire geophysical information in connection with a seismic survey. The technique includes processing the data to determine a position on the streamer relative to a reference position not disposed on the streamer.

Advantages and other features of the invention will become apparent from the following drawing, description and claims.

DETAILED DESCRIPTION

Figure 1:
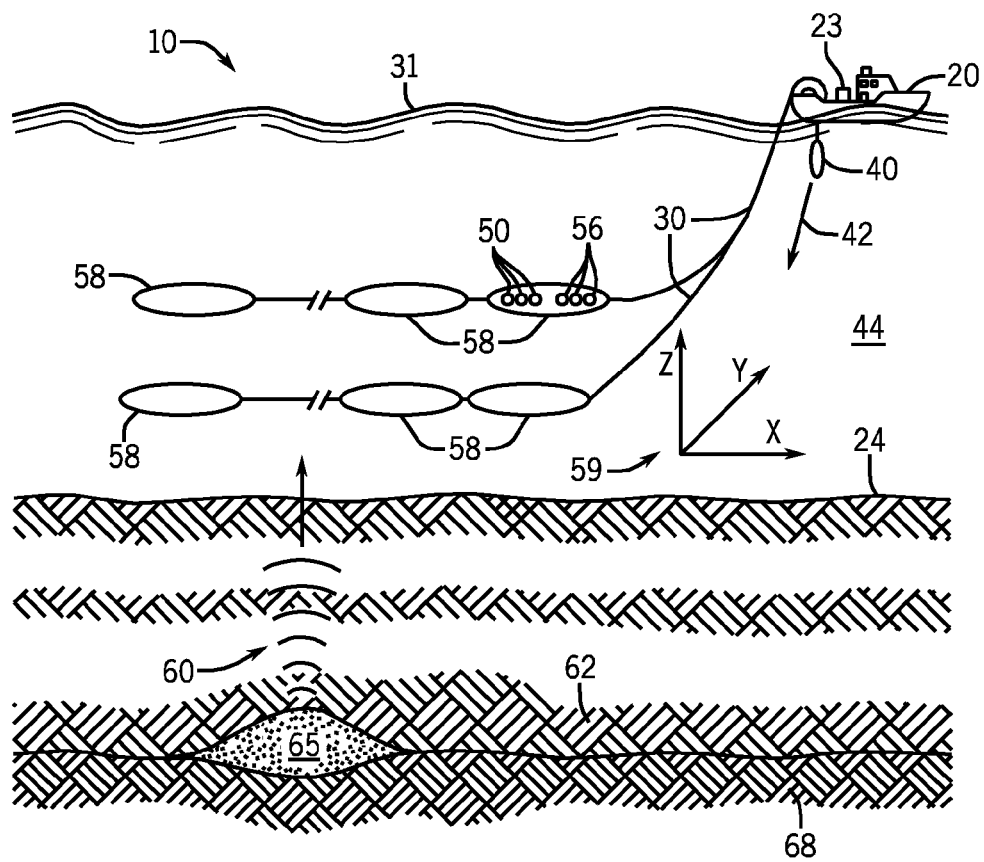
FIGS. 1 and 2 are schematic diagrams of marine-based seismic acquisition systems according to embodiments of the invention.

In accordance with embodiments of the invention disclosed herein, a marine-based seismic data acquisition system 10 includes a survey vessel 20, which tows one or more seismic streamers 30 (one exemplary streamer 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers 30 may be towed at multiple depths, such as in an over/under spread, as depicted in FIG. 1.

Each seismic streamer 30 may be several thousand meters long and may contain various support cables (not shown), as well as wiring and/or circuitry (not shown) that may be used to support communication along the streamers 30. In general, the streamer 30 includes a primary cable into which is mounted seismic sensors that record seismic signals.

In accordance with embodiments of the invention, the streamer 30 is a multi-component streamer, which means that the streamer 30 contains particle motion sensors 56 and pressure sensors 50. The pressure 50 and particle motion 56 sensors may be part of a multi-component sensor unit 58. Each pressure sensor 50 is capable of detecting a pressure wavefield, and each particle motion sensor 56 is capable of detecting at least one component of a particle motion that is associated with acoustic signals that are proximate to the sensor 56. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the streamer 30 may include hydrophones, geophones, particle displacement sensors, particle velocity sensors, accelerometers, pressure gradient sensors, or combinations thereof.

As a non-limiting example, in accordance with some embodiments of the invention, the particle motion sensor 56 measures at least one component of particle motion along a particular sensitive axis 59 (the x, y or z axis, for example). As a more specific example, the particle motion sensor 56 may measure particle velocity along the depth, or z, axis; particle velocity along the crossline, or y, axis; and/or velocity along the inline, or x, axis. Alternatively, in other embodiments of the invention, the particle motion sensor(s) 56 may sense a particle motion other than velocity (an acceleration, for example).

In addition to the streamer(s) 30 and the survey vessel 20, the marine seismic data acquisition system 10 also includes one or more seismic sources 40 (one exemplary seismic source 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and expand radially with a vertical component through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the seismic source(s) 40 produce corresponding reflected acoustic signals, or pressure waves 60, which are sensed by the towed seismic sensors. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors generate signals (digital signals, for example), called "traces," which indicate the acquired measurements of the pressure and particle motion wavefields. The traces are recorded and may be at least partially processed by a signal processing unit 23 that is deployed on the survey vessel 20, in accordance with some embodiments of the invention. For example, a particular pressure sensor 50 may provide a trace, which corresponds to a measure of a pressure wavefield by its hydrophone; and a given particle motion sensor 56 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land, on a streamer 30, distributed on several streamers 30, on a vessel other than the vessel 20, etc.

Figure 2:
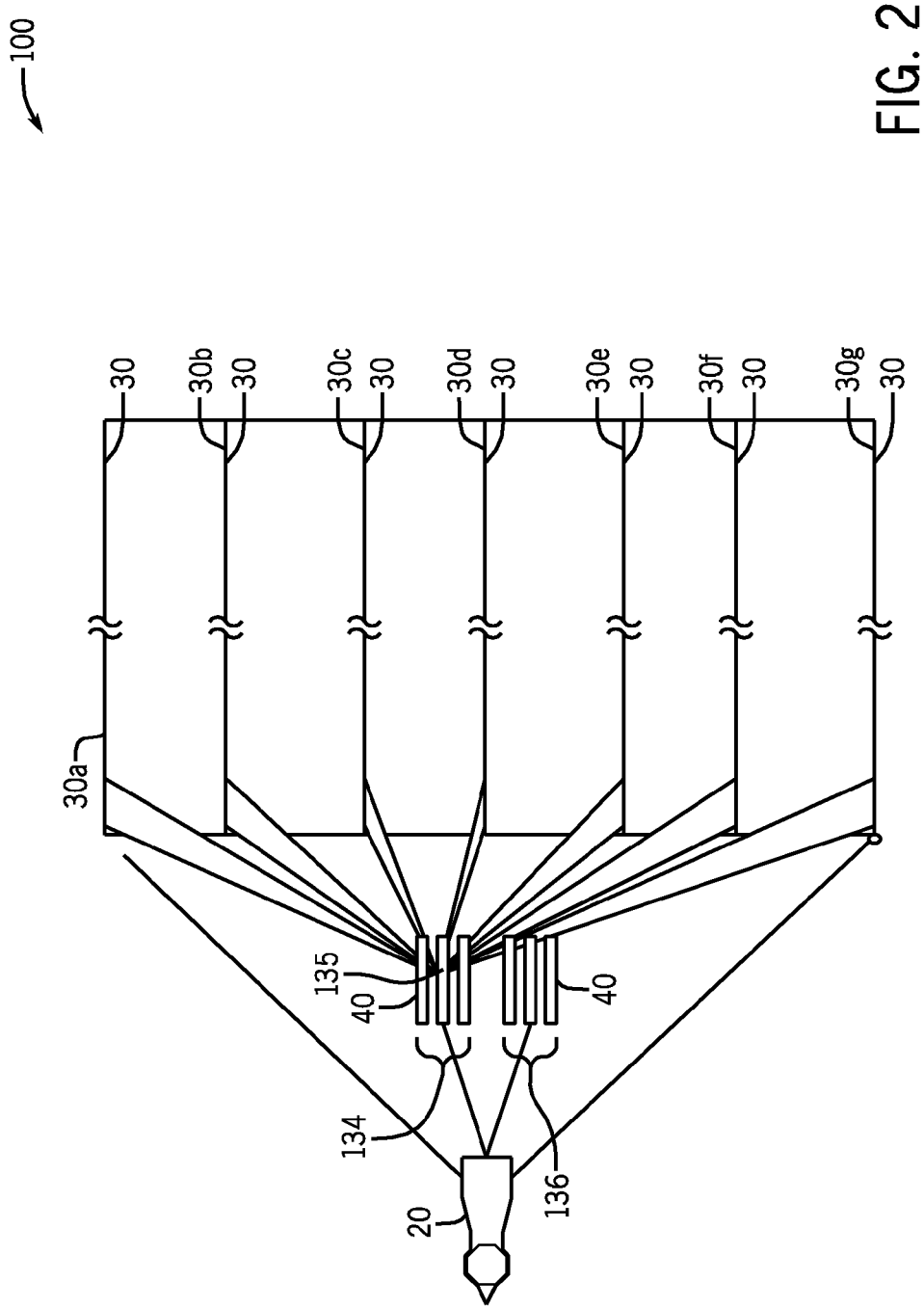

FIG. 2 depicts an exemplary overhead view of a marine-based seismic acquisition system 100 in accordance with embodiments of the invention. As shown, the seismic sources 40 may be arranged in seismic source groups such as exemplary groups 134 and 136. Each group may have an associated global positioning satellite (GPS) receiver that, in turn, acquires the GPS position of the seismic source group. For purposes of determining the positions of the streamers 30, GPS receivers may be disposed along each streamer cable 30. However, such an approach is typically relatively complicated and costly. Therefore, in accordance with embodiments of the invention disclosed herein, seismic measurements of the seismic source signature are used for purposes of determining the relative positions between the streamers 30 and the seismic source spread. Thus, this technique reduces the need to have GPS positions on the streamers 30 and reduces the complexity of the towing arrangement to allow faster mobilization/demobilization time, faster stacking of streamers and, in general, less equipment in the towing operation.

Because the seismic source signature has a relatively high amplitude, as it is intended to penetrate deep into the Earth, the signal may be detected at large distances away from the source. As described herein, this signature is used to determine travel times and determine positions on the streamers.

The seismic source 40 may include an array of smaller elements, and the primary purpose of the seismic source 40 is to produce a relatively high amplitude acoustic signal that may be used for purposes of imaging the Earth. The seismic frequency range is generally from 0 Hertz (Hz) to about 250 Hz. As examples, the seismic source 40 may include such elements as air guns, which are broadband impulsive sources. However, in other embodiments of the invention, the seismic source may include such elements as marine vibrators, water guns, sparkers, and so forth. Regardless of the particular implementation of the seismic source, all of these technologies may be used in accordance with embodiments of the invention for purposes of determining positions on the seismic streamers.

Figure 3:
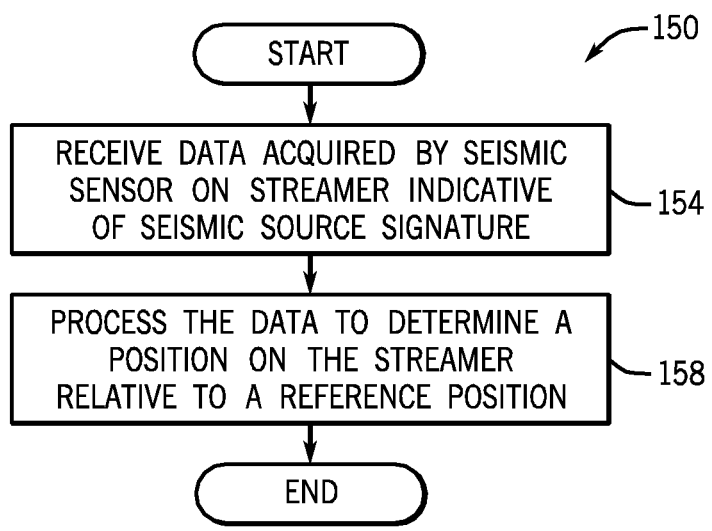
FIGS. 3 and 6 are flow diagrams depicting techniques to determine positions on streamers according to embodiments of the invention.

Referring to FIG. 3, in accordance with embodiments of the invention disclosed herein, a technique 150 includes receiving (block 154) data indicative of a seismic source signature and processing (block 158) the seismic data to determine a position on a seismic streamer relative to a reference position (a position disposed on the seismic source, as a non-limiting example) that is not disposed on the streamer.

Figure 4:
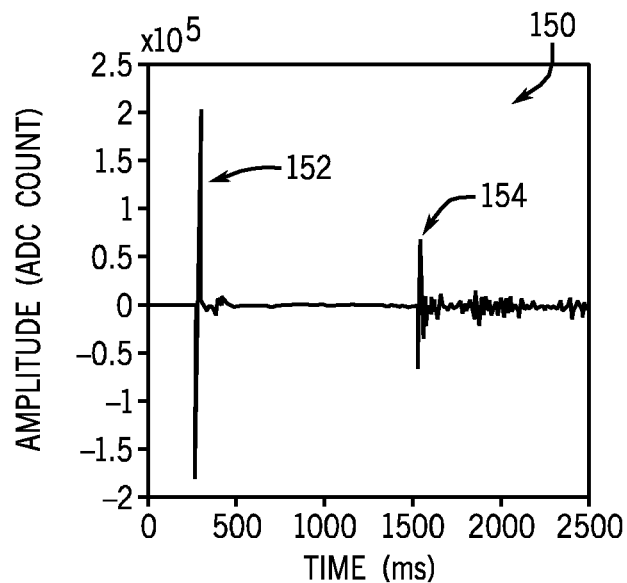
FIGS. 4 and 5 are waveforms of sensed seismic source signals according to embodiments of the invention.

Referring to FIG. 4 in conjunction with FIG. 2, the seismic source signature is emitted at a known time, and produces a particular seismic source signature 150. This signature 150 includes a direct arrival 152, which is the portion of the sensed signal 150 attributable to the seismic energy arriving at the seismic sensor without first being reflected and another portion 154 attributable to the seismic energy that is reflected off the sea bed. By knowing the time of emission and the time of arrival of the source signature, the travel time between the seismic source and the particular receiver may be calculated. As a result, the corresponding range between the seismic source and receiver may be calculated. Thus, by measuring the travel times between the seismic sources and various receivers on the streamers, positions of various points on the streamer may be determined.

Depending on the particular embodiment of the invention, the receivers on the streamer 30 may be seismic sensors 50 or they may be an intrinsic range modulation array (IRMA) acoustic receivers that sample data at a higher sampling rate, such as data having frequency in the one thousand to eight thousand Hertz (Hz) or above range. Thus, in accordance with some embodiments of the invention, the receivers may be relatively high frequency receivers, such as receivers that are configured to sense signals in the frequency range of 250 Hz to about 4 kiloHertz (kHz). For the receiving sensor and for a given azimuth and takeoff angle, the combined signal of the source elements appear to the front end of the streamers 30 to originate from a point, such as exemplary point 135 of FIG. 2, which correspond to the phase center of the source 40. For a symmetric (in volume and geometry) air gun distribution, this point coincides with the center of source (CoS).

As described further below, by acquiring a series of travel times, or ranges, the source-receiver geometry may thereafter be determined. In practice, the acoustic ranges for the seismic source 40 to the streamer spread is incorporated into a greater network of acoustic pinger and receivers on the streamers 30; and the entire system is solved simultaneously, thereby providing higher efficiency and accuracy. There might also be a dedicated acoustic positioning system on the source, which may also be produce ranges to be included in this network, in accordance with some embodiments of the invention.

Because the seismic source has a relatively strong, or high, amplitude, another possibility is to use the bottom reflections (i.e., signal portion 154 in FIG. 4) as the positioning signal. For these embodiments of the invention, the local bathymetry and streamer depth are taken into account.

Figure 5:
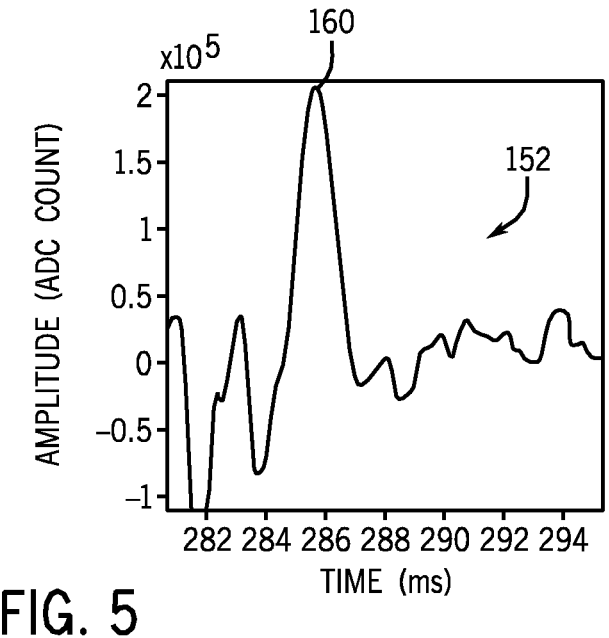

For purposes of determining the travel times, as depicted in FIG. 4, the direct arrival portion 152 has sufficiently high frequency energy in the source signal which allows first break picking. Thus, as illustrated in a more detailed portion of FIG. 4 in FIG. 5, the signal portion 152 includes a relatively high peak 160. If an even narrower peak is to be used, a deconvolution or correlation operator may be used.

As a non-limiting example, the correlation operator may be constructed from a model that is combined with near field measurements of the source elements or it may be picked directly from the traces. Because the seismic source 40 is not omnidirectional, the same operator, in general, is not used for all the signals.

In the following discussion, the sources 40 are each individually considered to emit energy at respective source nodes, and the receivers on the streamers 30 sense this energy at corresponding receiver nodes. For all acquired measurements, each of the travel times, called "$y_{ij}$," between a source node i and receiver node j may be described as follows:

$$y_{ij}=f(x,c),\qquad \text{Eq. 1}$$

where "x" represents a state vector of node position coordinates (and potentially other parameters), which specify the positions of nodes i, j and f in the chosen coordinate system, relative to a reference position (a position on one of the seismic sources 40, as a non-limiting example) that is not disposed on the streamers 30.

For the acoustic data, a model of the travel times $y_{ij}$ between source node i and the receiver node j may be described as follows:

$$y_{ij}=f(x_i,y_iz_i,x_j,y_jz_j)=\sqrt{(x_i-x_j)^2+(y_i-y_j)^2+(z_i-z_j)^2}\Big/c,\qquad \text{Eq. 2}$$

where "c" represents the speed of sound. It is noted that Eq. 2 assumes a constant speed of sound speed and thus, rectilinear propagation.

For the example set forth herein, Cartesian coordinates are assumed. However, other coordinate systems may be used, in accordance with other embodiments of the invention.

The above-described model may be expanded, in accordance with embodiments of the invention, to acknowledge that the travel time measurements may be generally corrupted by noise, thereby resulting in the following alternative model for the travel times $y_{ij}$:

$$y=f(x)+\epsilon, \forall i,j,\qquad \text{Eq. 3}$$

where "$\epsilon$" represents an error process that may be generally unknown but may assume to be Gaussian, in accordance with embodiments of the invention.

Equation 3 may be inverted, in accordance with embodiments of the invention described herein, for purposes of determining the receiver node positions. The coordinates may be determined by, for example, minimizing a cost function (called "g" herein), which reflects the fit of the solution as a function of the residuals, as set forth below:

$$\bar{x}=\min_x g(\hat{y}-f(x)).\qquad \text{Eq. 4}$$

Robustness in determining the receiver positions is enhanced by having many more measurements than unknowns. For this case, a technique such as least squares may be used for purposes of determining the receiver node positions.

As a more specific example, applying the least squares technique produces the following optimization problem:

$$\bar{x}=\min\frac{1}{2}\|w(x)(\hat{y}-f(x))\|_2^2,\qquad \text{Eq. 5}$$

where "$\bar{x}$" represents the least squares estimate; and "w(x)" represents a weight function that adjust the relative contributions of the measurements according to their joint precisions.

In accordance with some implementations, the w(x) weight function takes on the form of a positive definite matrix. Furthermore, in accordance with some implementations, the least squares estimate is the inverse of the covariance matrix, also called the dispersion matrix. The least squares problem set forth in Eq. 5 is nonlinear and typically solved by a second order Newton method. The Jacobian in this case typically is sparse and structured; and significant reductions in computational complexity may be achieved by exploiting this structure order Newton method.

Figure 6:
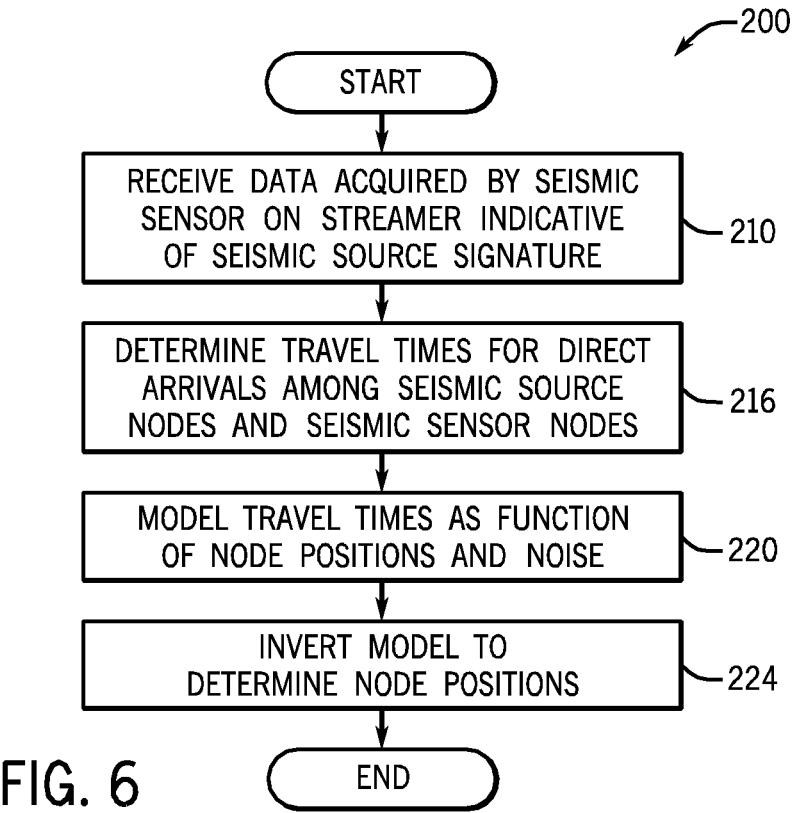

Referring to FIG. 6, thus, in accordance with embodiments of the invention disclosed herein, a technique 200 to determine the node positions on streamers 30 includes receiving (block 210) data acquired by seismic receivers, which are indicative of seismic source signatures. The technique 200 includes determining travel times for direct arrivals among the seismic source and receiver nodes and modeling (block 220) the travel times as a function of these seismic source and receiver nodes and noise. Finally, the technique 200 includes inverting (block 224) the model to determine the node positions.

Figure 7:
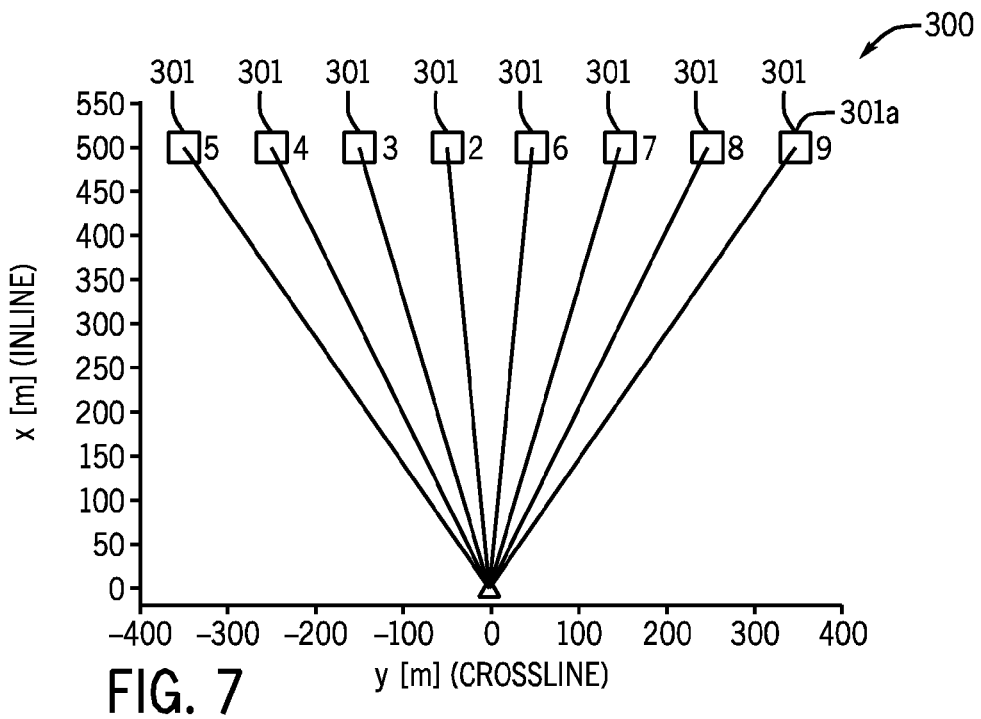
FIGS. 7 and 8 illustrate determined seismic streamer geometries according to an embodiment of the invention.
Figure 8:
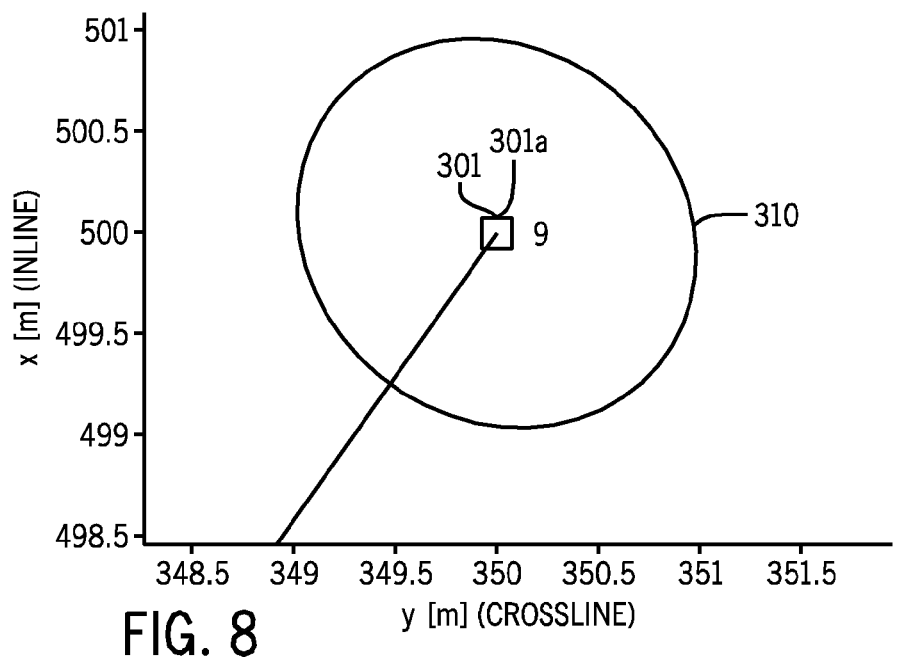

FIG. 7 illustrates front end node positions 301 on a seismic data acquisition system including eight streamers. Each of the node positions 301 has some degree of uncertainty, as illustrated in FIG. 8 for one of the node positions 301a. As shown in FIG. 8, the determined node position 301a has an associated error ellipse 310, which represents the two dimensional uncertainty in the determined position.

Figure 9:
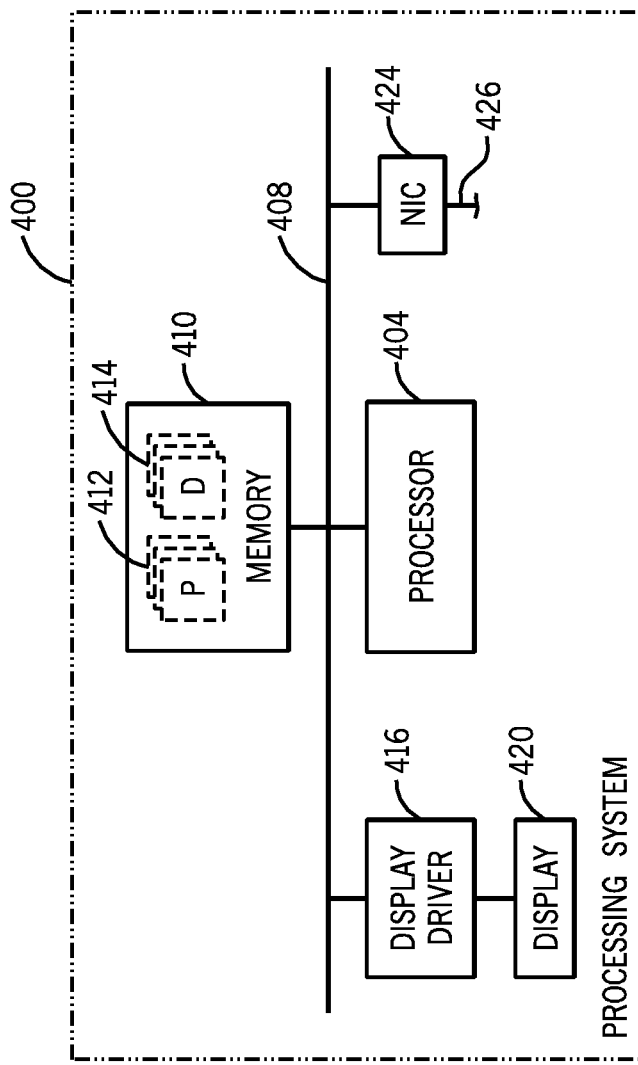
FIG. 9 is a schematic diagram of a data processing system according to an embodiment of the invention.

Referring to FIG. 9, in accordance with some embodiments of the invention, a data processing system 400 may be used for purposes of performing the seismic data quality control analyses disclosed herein. The data processing system 400 may be part of the signal processing unit 23 (see FIG. 1) in some implementations. It is noted that the architecture of the processing system 400 is illustrated merely as an example, as the skilled artisan would recognize many variations and deviations therefrom. For example, in some embodiments of the invention, the processing system may be a distributed system that is located at different local and/or remote locations. All or part of the data processing system may be disposed on the vessel 20, on a streamer 30, on a platform, at a remote processing facility, etc., depending on the particular embodiment of the invention.

In the example that is depicted in FIG. 9, the data processing system 400 includes a processor 404, which executes program instructions 412 that are stored in a system memory 410 for purposes of causing the processor 404 to perform some or all of the techniques that are disclosed herein. As non-limiting examples, the processor 404 may include one or more microprocessors and/or microcontrollers, depending on the particular implementation. In general, the processor 404 may execute program instructions 412 for purposes of causing the processor 404 to perform all or parts of the techniques 150 and/or 200, which are disclosed herein as well as other techniques that use the seismic source signature to determine streamer positions, in accordance with various embodiments of the invention.

The memory 410 may also store datasets 414 which may be initial, intermediate and/or final datasets produced by the processing by the processor 404. For example, the datasets 414 may include data indicative of seismic data, data indicative of seismic source signature, particle motion data, data indicative of calculated travel times, etc.

As depicted in FIG. 9, the processor 404 and memory 410 may be coupled together by at least one bus 408, which may couple other components of the processing system 400 together, such as a network interface card (NIC) 424. As a non-limiting example, the NIC 424 may be coupled to a network 426, for purposes of receiving such data as particle motion data, specification thresholds, model parameters, etc. As also depicted in FIG. 9, a display 420 of the processing system 408 may display initial, intermediate or final results produced by the processing system 400. In general, the display 420 may be coupled to the system 400 by a display driver 416. As a non-limiting example, the display 420 may display an image, which graphically depicts measured travel times, streamer positions, seismic source signatures, etc.

Other variations are contemplated and are within the scope of the appended claims. For example, in accordance with other embodiments of the invention, the techniques and systems that are disclosed herein may be used with seismic acquisition systems other than towed systems. In this regard, the systems and techniques that are disclosed herein may be used in connection with land-based surveys, seabed-based surveys, borehole-based surveys, etc.

As another example, in accordance with some embodiments of the invention, the seismic spread may contain high frequency sensors (sensors that sense energy in the 250 Hz to about 4 kHz range, for example), which are used primarily to determine the positions on the streamer relative to the streamer spreads front end. Therefore, in accordance with some embodiments of the invention, the positioning of the streamer spread may be determined at least in part by a combination of positioning systems using different frequency ranges. Moreover, in accordance with some embodiments of the invention, the positioning systems disclosed herein may be integrated with an electromagnetic positioning system, such as the one described in U.S. patent application Ser. No. 12/606,981, entitled, "POSITIONING A SEISMIC ACQUISITION SYSTEM USING ELECTROMAGNETIC SIGNALS,", which is hereby incorporated by reference in its entirety or a wave radar system, such as the one described in U.S. patent application Ser. No. 12/706,701, entitled, "METHOD FOR POSITIONING THE FRONT OF THE STREAMER SPREAD," which is hereby incorporated by reference in its entirety. Furthermore, in accordance with some embodiments of the invention, the sources (high frequency sources, such as sources in the 250 Hz to 4 kHz range, as a non-limiting example) may be disposed on the streamer spread, which transmit signals that are received by receivers on the towed source array.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving seismic measurements acquired by at least one sensor on a spread of at least one streamer, the seismic measurements being indicative of a seismic source signature produced by a seismic source to penetrate into the Earth to acquire geophysical information in connection with a seismic survey;
   determining a plurality of positions on the streamer relative to a reference position not disposed on the streamer based at least in part on the seismic measurements; and
   processing the seismic measurements to determine at least part of the geophysical information.

2. The method of claim 1, wherein the act of processing comprises determining the plurality of positions on the streamer relative to a position on the seismic source.

3. The method of claim 1, further comprising:
   processing the seismic measurements to determine global positioning system coordinates of the plurality of positions on the streamer.

4. The method of claim 1, wherein the processing comprises:
   determining the plurality of positions based at least in part on a plurality of travel times between the seismic source and the positions on the streamer.

5. The method of claim 4, wherein the act of determining the plurality of positions further comprises:
   modeling the travel times as a function of the plurality of positions; and
   inverting the function for the plurality of positions based on the travel time.

6. The method of claim 4, further comprising:
   determining the plurality of travel times from picking an energy peak or applying a correlation operator to the seismic measurements.

7. The method of claim 1, further comprising:
   receiving data acquired by at least one additional sensor indicative of a source other than a seismic source,
   wherein the processing further comprises processing the data and the seismic measurements to determine the plurality of positions.

8. The method of claim 7, wherein the processing comprises processing the data and the seismic measurements to determine positions on a front end of the spread.

9. The method of claim 7, wherein the additional source comprises a source adapted to emit energy in the range of approximately 250 Hz to 4 kHz.

10. The method of claim 1, further comprising processing data indicative of wave radar measurements to determine the plurality of positions on the streamer.

11. The method of claim 1, further comprising:
    processing data acquired in connection with electromagnetic measurements to determine the plurality of the positions on the streamer.

12. A method comprising:
    receiving seismic measurements acquired by sensors on a spread of streamers, the seismic measurements being indicative of seismic source signatures produced by the source seismic sources to penetrate into the Earth to acquire geophysical information in connection with a seismic survey;
    determining a plurality of positions on the streamers relative to a reference position not disposed on the streamers based at least in part on the seismic measurements; and
    processing the seismic measurements to determine at least part of the geophysical information.

13. The method of claim 12, wherein the act of processing comprises simultaneously determining the plurality of positions on the streamers.

14. The method of claim 12, wherein the processing comprises:
    determining the plurality of positions based at least in part on a plurality of travel times between the seismic sources and the plurality of positions.

15. The method of claim 14, wherein the act of determining the plurality of positions further comprises:

modeling the plurality of travel times as a function of the plurality of positions; and inverting the function for the positions based on the plurality of travel times.

16. A system comprising:

an interface to receive seismic measurements acquired by sensors on a spread of streamers, the seismic measurements being indicative of seismic source signatures produced by the source seismic sources to penetrate into the Earth to acquire geophysical information in connection with a seismic survey; and a processor coupled to the interface to determine a plurality of positions on the streamers relative to a reference position not disposed on the streamers based at least in part on the seismic measurements and process the seismic measurements to determine at least part of the geophysical information.

17. The system of claim 16, wherein the processor is disposed on at least one of the streamers.

18. The system of claim 16, further comprising:

the streamers; and a vessel to tow the streamers.

19. The system of claim 16, wherein the processor is adapted to simultaneously determine the plurality of positions on the streamers.

20. The system of claim 16, wherein the processor is adapted to determine the positions based at least in part on a plurality of travel times between the seismic sources and the plurality of positions.

21. The system of claim 20, wherein the processor is adapted to model the plurality of travel times as a function of the plurality of positions to allow for inversion of the function for the plurality of positions.

22. An article comprising a non-transitory computer readable storage medium to store instructions that when executed by a computer cause the computer to:

receive seismic measurements acquired by a seismic sensor on a spread of at least one streamer, the seismic measurements being indicative of a seismic source signature produced by a seismic source to penetrate into the Earth to acquire geophysical information in connection with a seismic survey; and determine a position on the streamer relative to a reference position not disposed on the streamer based at least in part on the seismic measurements and process the seismic measurements to determine at least part of the geophysical information.

23. The article of claim 22, the storage medium storing instructions that when executed by the computer cause the computer to determine the position on the streamer relative to a position on the seismic source.

24. The article of claim 22, the storage medium storing instructions that when executed by the computer cause the computer to process the seismic measurements to determine global positioning system coordinates of the position on the streamer.

25. The article of claim 22, the storage medium storing instructions that when executed by the computer cause the computer to determine the position based at least in part on a travel time between the seismic source and the position on the streamer.

* * * * *